(12) United States Patent
Era

(10) Patent No.: US 7,643,672 B2
(45) Date of Patent: Jan. 5, 2010

(54) IMAGE PROCESSING APPARATUS, IMAGE PICKUP DEVICE AND PROGRAM THEREFOR

(76) Inventor: Kazunari Era, 4-1-11-201, Matsuba-cho, Kashiwa-shi, Chiba (JP) 277-0827

( * ) Notice: Subject to any disclaimer, the term of this patent is extended or adjusted under 35 U.S.C. 154(b) by 633 days.

(21) Appl. No.: 11/208,789

(22) Filed: Aug. 23, 2005

(65) Prior Publication Data

US 2006/0088206 A1 Apr. 27, 2006

Related U.S. Application Data

(60) Provisional application No. 60/620,331, filed on Oct. 21, 2004.

(51) Int. Cl.
*G06K 9/00* (2006.01)
(52) U.S. Cl. .......................... 382/154; 345/8
(58) Field of Classification Search ............... 382/154
See application file for complete search history.

(56) References Cited

U.S. PATENT DOCUMENTS

| | | | |
|---|---|---|---|
| 6,034,690 A * | 3/2000 | Gallery et al. ............... 345/419 |
| 6,055,330 A * | 4/2000 | Eleftheriadis et al. ....... 382/154 |
| 6,078,427 A * | 6/2000 | Fontaine et al. ............. 359/630 |
| 6,108,005 A * | 8/2000 | Starks et al. ................. 345/419 |
| 6,111,597 A * | 8/2000 | Tabata ........................... 348/43 |
| 6,160,574 A * | 12/2000 | Oba et al. ...................... 348/46 |
| 6,204,876 B1 * | 3/2001 | Uomori et al. ................ 348/47 |
| 6,252,982 B1 * | 6/2001 | Haisma et al. .............. 382/154 |
| 6,289,115 B1 * | 9/2001 | Takeo .......................... 382/130 |
| 6,289,329 B1 * | 9/2001 | Sethi et al. .................... 706/26 |
| 6,384,859 B1 * | 5/2002 | Matsumoto et al. ........... 348/43 |
| 6,466,208 B1 * | 10/2002 | Yet et al. ..................... 345/427 |
| 6,496,598 B1 * | 12/2002 | Harman ...................... 382/154 |
| 7,054,478 B2 * | 5/2006 | Harman ...................... 382/154 |
| 7,369,142 B2 * | 5/2008 | Kondo et al. ................ 345/633 |
| 2002/0118275 A1 * | 8/2002 | Harman ......................... 348/51 |
| 2002/0191841 A1 * | 12/2002 | Harman ...................... 382/154 |
| 2005/0053274 A1 * | 3/2005 | Mayer et al. ................ 382/154 |
| 2006/0088206 A1 * | 4/2006 | Era ............................. 382/154 |
| 2006/0119597 A1 * | 6/2006 | Oshino ........................ 345/418 |

FOREIGN PATENT DOCUMENTS

| | | |
|---|---|---|
| JP | A-2001-526477 | 12/2001 |
| JP | A-2002-123842 | 4/2002 |
| WO | WO 99/30280 | 6/1999 |

\* cited by examiner

*Primary Examiner*—Sath V Perungavoor
(74) *Attorney, Agent, or Firm*—Oliff & Berridge PLC

(57) ABSTRACT

A central processing unit (CPU) generates, from original image data representing an image, a right eye image and a left eye image mutually having a parallax. The CPU also specifies the 3D transformation parameter depending on the indication by a user, and stores the specified 3D transformation parameter in storage device in association with original image data.

12 Claims, 8 Drawing Sheets

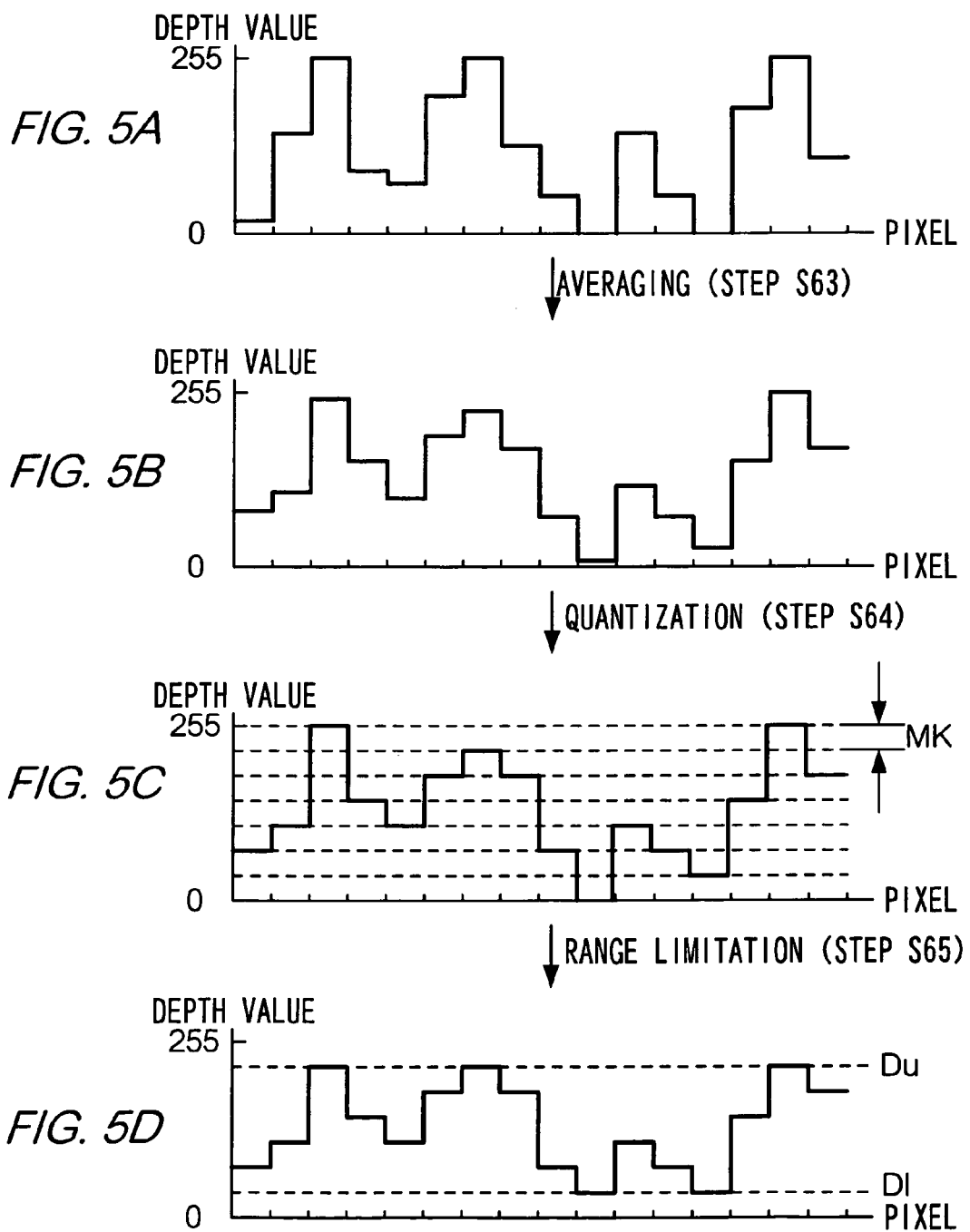

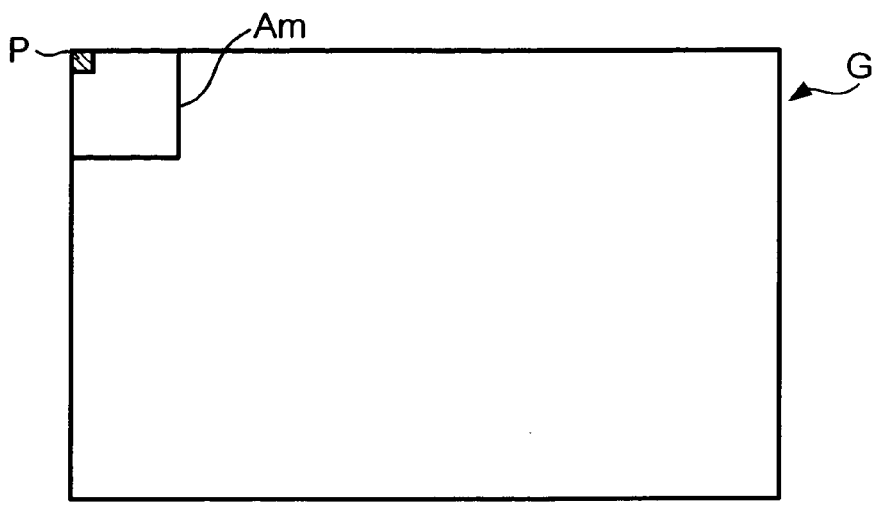
FIG. 6
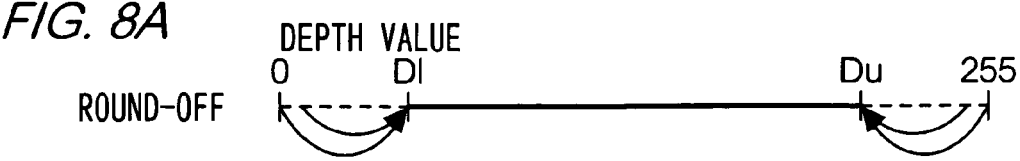
FIG. 7
FIG. 8A
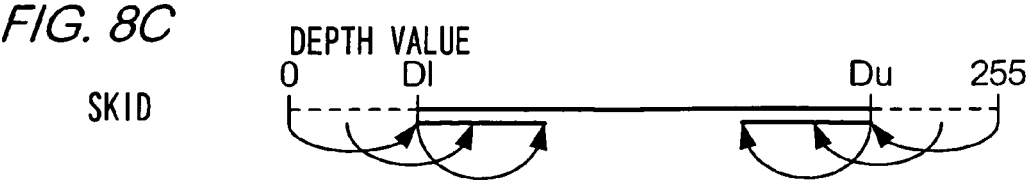
FIG. 8B
FIG. 8C

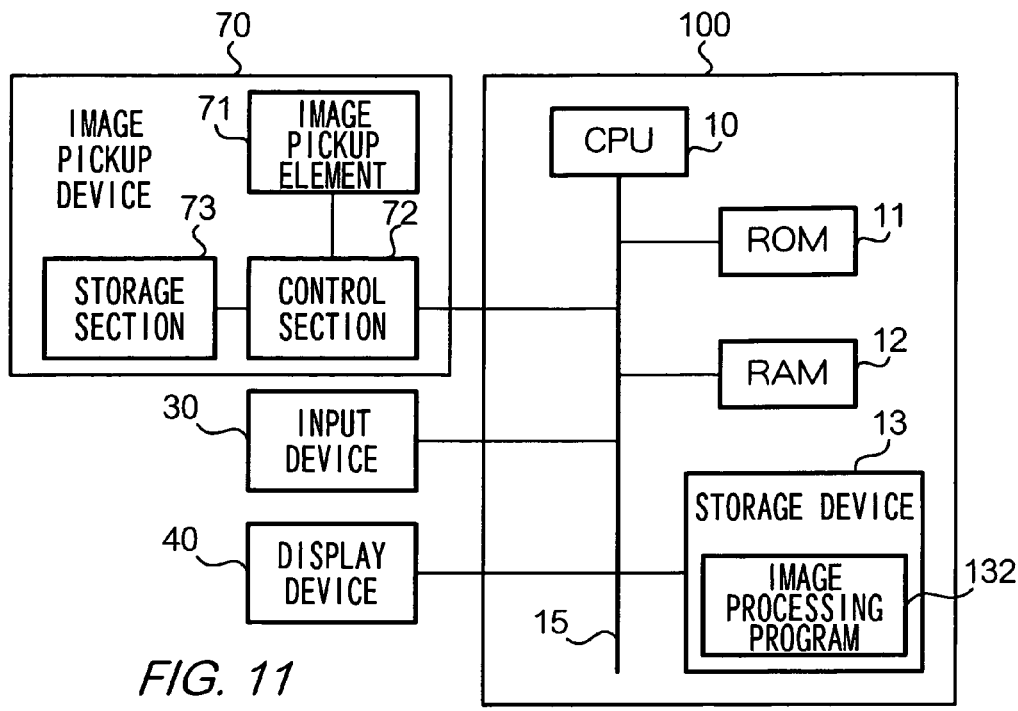
FIG. 11
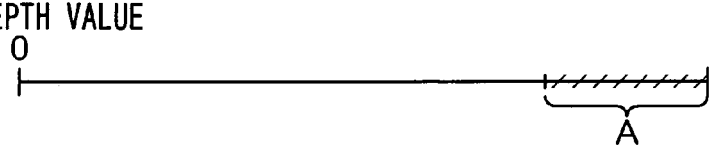
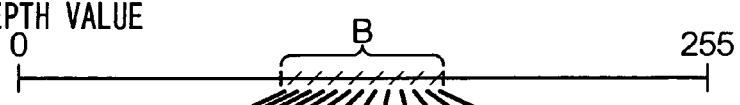
FIG. 15

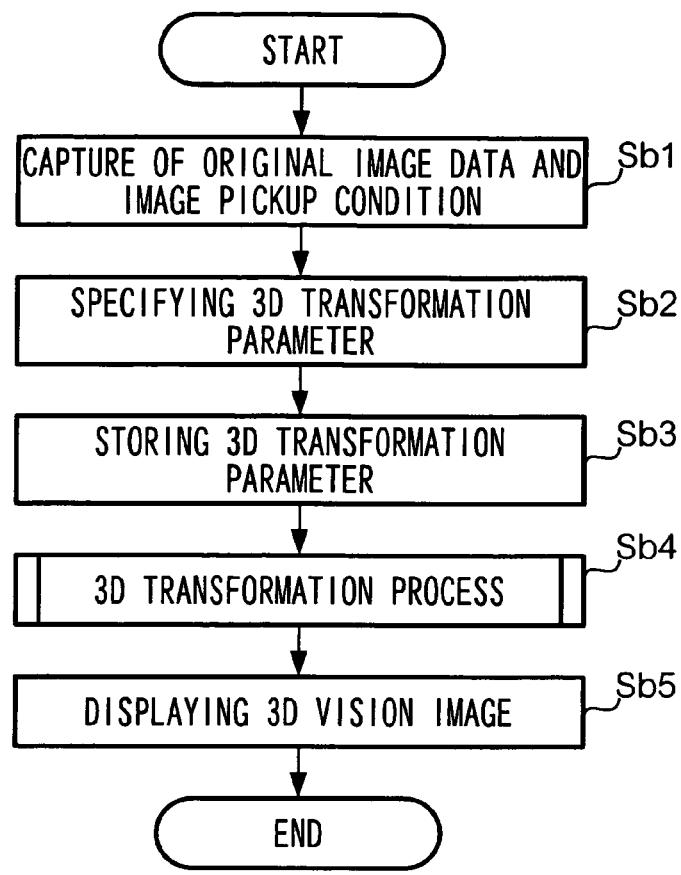

IMAGE PROCESSING APPARATUS, IMAGE PICKUP DEVICE AND PROGRAM THEREFOR

This nonprovisional application claims the benefit of U.S. Provisional Application No. 60/620,331, filed Oct. 21, 2004. The entire disclosure of the prior application is hereby incorporated by reference herein in its entirety.

BACKGROUND OF THE INVENTION

1. Field of the Invention

The present invention relates to a technology for making from a plane image an image which can be perceived by a user as a 3D (three-dimensional) object.

2. Description of the Related Art

By providing two images having a mutual parallax, and making a user view one image with his/her left eye and the other with the right eye, the image can be perceived as a 3D image by the user. A process for making such images having a mutual parallax (which is called "3D vision image set" hereafter) from a plane image is proposed, for example, in Japanese Laid-open Patent Publication 2002-123842. In the technology, the 3D vision image set is produced by using various parameters such as depth of an image to be perceived by the user who views the images.

It would be convenient, when using the above technology, if the user could select his/her preferable values of those various parameters to be used for producing 3D vision image set, so that he/she can generate an image having his/her favorite 3D effect. However, when such a construction to be applied to the above technology, it is necessary for the user to indicate the parameter(s) in each 3D transformation process with regard to a plane image, which is a cumbersome task for the user to perform. Especially, when the 3D transformation process is carried out for a moving picture comprising plural continuous images, the user is required to indicate the parameter(s) for each of the plural continuous images, and such tasks are extremely cumbersome for the user.

The present invention has been accomplished in view of the above circumstances and is established to provide an image processing apparatus, an image pickup device, and a program for reducing the burden on the user of having to input various parameters in the 3D image transformation process.

SUMMARY OF THE INVENTION

In order to solve the above problems, a first feature of the present invention comprises: a 3D transformation unit for executing 3D transformation process for generating from original image data of an image a right eye image and a left eye image mutually having a parallax; a parameter specifying unit for specifying a 3D transformation parameter used for the 3D transformation process depending on an indication by a user; and a control unit for storing the 3D transformation parameter specified by the parameter specifying unit in a storage device in association with the original image data.

According to this construction, the 3D transformation parameter specified based on an indication by a user is stored in the storage device together with original image data. Therefore, once the 3D transformation parameter is specified based on the indication by the user, there is no need for the 3D transformation parameter to be specified again. Thus, the burden on the user to input various parameters regarding the 3D image transformation process is reduced.

A second feature of the present invention comprises: a 3D transformation unit for executing a 3D transformation process for generating from original image data of an image a right eye image and a left eye image mutually having a parallax; a capture unit for capturing an original image data of an image picked up by an image pickup device for picking up an image of an object and an image pickup condition under which the image is picked up; a parameter specifying unit for specifying a 3D transformation parameter to be used for the 3D transformation process based on the image pickup condition captured by the capture unit; and a control unit for storing the 3D transformation parameter specified by the parameter specifying unit in a storage device in association with the original image data captured by the capture unit.

According to this construction, the 3D transformation parameter is specified based on the image pickup condition captured by the image pickup device. Thus, there is no need for the user to indicate the 3D transformation parameter. Therefore, the burden on the user to input various parameters regarding the 3D image transformation process is reduced. Further, if the environment (such as brightness in the surrounding space) at the time of an image pickup is well suited to the image pickup conditions, a 3D vision image of an accurate reproduction of the image of the original object is obtained by using the 3D transformation parameters specified based on the image pickup conditions.

In the image processing apparatus having the above first or second feature, the 3D transformation parameter may be added to either the head or the bottom portion of original image data, or the 3D transformation parameter and original image data may be stored separately while storing a table correlating the information for identifying original image data and the 3D transformation parameter in the storage device.

In the image processing apparatus having the above first or second feature, the 3D transformation unit may comprise a calculation unit for obtaining a depth value for each pixel from the original image data; an adjusting unit for adjusting the depth value obtained by the calculation unit; and an image generating unit for generating the right eye image and the left eye image mutually having a parallax corresponding to the depth value obtained by the adjusting unit, and the 3D transformation parameter specified by the parameter specifying unit may include a parameter related to the adjustment of the depth value by the adjusting unit. By such construction, depth value for each pixel can be adjusted while reducing the burden on the user for indication.

Also, in the image processing apparatus having an adjusting unit for adjusting the depth value for each pixel may comprise the following structure. First, when the adjusting unit comprises a unit for adding a perspective depth value, which is a common value with regard to all pixels, to the depth value for each pixel, the 3D transformation parameter specified by the parameter specifying unit may include the perspective depth value. According to this construction, the depth of the whole image perceived by the user viewing the 3D vision image is adjusted depending on the 3D transformation parameter. When the adjusting unit comprises a unit for revising the depth value for each pixel into an average depth value of depth values of pixels in an area including the each pixel, the 3D transformation parameter specified by the parameter specifying unit may include a value denoting a dimension of the area. According to this construction, the quality of the 3D vision image can be maintained by suppressing the difference between the depth values of the neighboring pixels.

When the adjusting unit comprises a unit for approximating the depth value for each pixel into one of plural discrete values, the 3D transformation parameter specified by the parameter specifying unit may include a value for specifying a round-off value denoting a distance between the discrete values. In this construction, the number of depth values can be changed depending on the number of discrete values so that the range of the depth value of the 3D vision image is properly selected, and the parallax of the 3D vision image is limited within a prescribed range. In this structure, the value for specifying the round-off value may be an object depth value denoting a number of the discrete values When the adjusting unit comprises a unit for adjusting the depth value for each pixel to a value within a prescribed range, the 3D transformation parameter specified by the parameter specifying unit may include at least one of an upper limit and a lower limit of the prescribed range. According to this construction, the depth value of each pixel is limited within a prescribed range hence the parallax of the 3D vision image can be limited within a range where the user can view.

In the image processing apparatus according to the present invention, when the control unit stores plural sets of the original image data each of which is data of an image constituting a moving picture in the storage device, the 3D transformation unit may execute the 3D transformation process with regard to each of the plural sets of the original image data in real time (that is, at each time an image of a set of the original image data is displayed) using the 3D transformation parameter stored in the storage device in association with the original image data.

The present invention may be defined as a program for making a computer function as the image processing apparatus having the above first or second feature. This program may be provided to the computer through a network, or can be provided in a form as stored in various recording media as typified by an optical disk, and installed to a computer.

The present invention may also be defined as data to be processed by the image processing apparatus having the above first or second feature. Regarding the first feature, the data is processed by an image processing apparatus, which executes a 3D transformation process for generating from original image data of an image, a right eye image and a left eye image mutually having a parallax, and the data comprises a data structure where a 3D transformation parameter used in the 3D transformation process, which is specified based on an indication by a user, and the original image data to be processed using the 3D transformation parameter are correlated with each other. Regarding the second feature, the data is processed by an image processing apparatus, which executes a 3D transformation process for generating from original image data representing an image, a right eye image and a left eye image mutually having a parallax, and the data comprises a data structure where the original image data obtained from an image pickup device for picking up an image of an object and a 3D transformation parameter, which is specified based on an image pickup condition obtained from the image pickup device under which the image is picked up, are correlated with each other.

An image pickup device according to the present invention is characterized in that the device provides original image data to be processed by the image processing apparatus having the second feature. That is, the image pickup device comprises an image pickup an image pickup unit for picking up an image of an object under a certain image pickup condition; and a control unit for storing the original image data of the image picked up by the image pickup unit and the image pickup condition under which the image is picked up in a storage device, the image pickup condition is used for specifying a 3D transformation parameter which is used for the 3D transformation process of the image.

BRIEF DESCRIPTION OF THE DRAWINGS

Embodiments of the present invention will be described in detail based on the following figures, wherein:

FIG. 5 illustrates a content of adjustment process of depth value;

FIG. 6 illustrates a content of reversal process;

FIG. 7 illustrates a content of averaging process;

FIG. 8 illustrates a content of range limiting process;

FIG. 11 is a block diagram illustrating an image processing apparatus of a second embodiment according to the present invention;

FIG. 12 illustrates a depth value extension process executed in the second embodiment;

FIG. 13 illustrates a flowchart describing the content of an image processing program for the second embodiment;

FIG. 14 illustrates a content stored in the storage device in a modified embodiment; and FIG. 15 illustrates a content stored in the storage device in a modified embodiment.

DETAILED DESCRIPTION OF THE INVENTION

Embodiments of the present invention will be described by referring to the attached drawings.

A: First Embodiment

Figure 1:
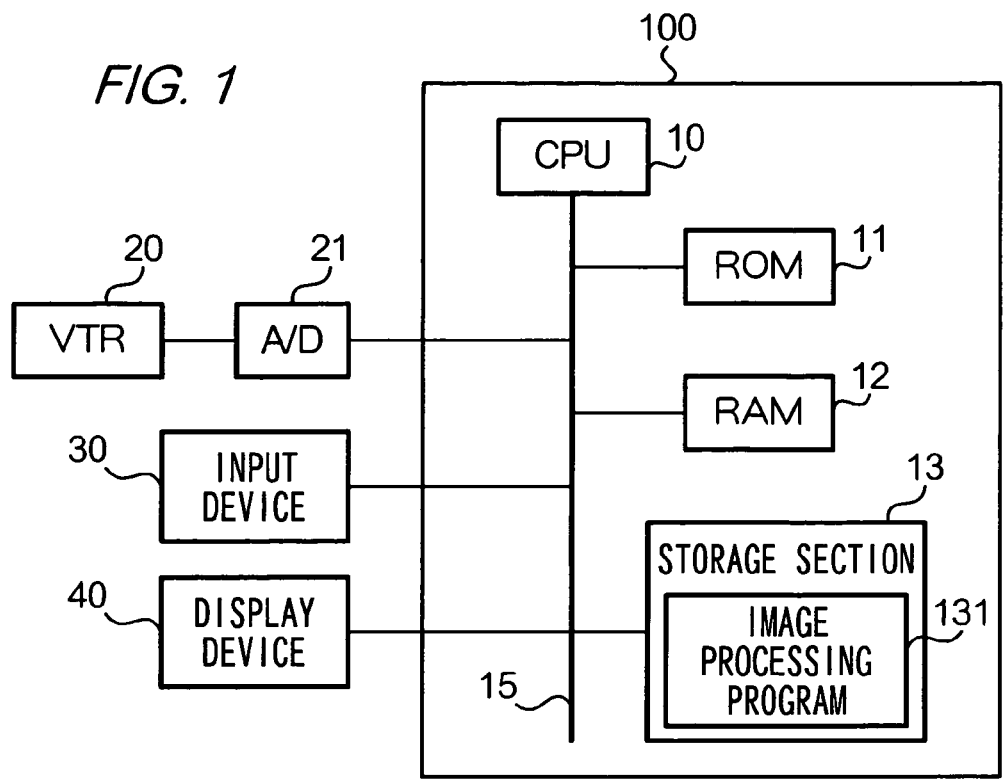
FIG. 1 is a block diagram illustrating an image processing apparatus of an embodiment according to the present invention.

FIG. 1 is a block diagram illustrating the construction of an image processing apparatus according to a first embodiment of the present invention. As shown in the figure, image processing apparatus 100 comprises: CPU (Central Processing Unit) 10; ROM (Read Only Memory) 11; RAM (Random Access Memory) 12; and storage device 13 which are connected to CPU 10 through bus 15. Display device 40 and input device 30 are also connected to bus 15. As described above, image processing apparatus 100 has a similar structure to that of a commonly used computer as typified by a personal computer.

CPU 10 is for centrally controlling each portion of image processing apparatus 100 to realize various functions by executing calculations and control of the portions according to a program. ROM 11 is a memory for storing a program run by CPU 10, and RAM 12 is a memory providing a work area for CPU 10.

Storage device 13 is a device for storing various programs run by CPU 10 or various data used during the execution of such programs. Storage device 13 can be comprised of a hard disk drive containing a magnetic disk, or other disk drives loading portable storage medium typified by a CD-ROM. Storage device 13 is installed with, in addition to an OS (Operating System) for managing overall performance of image processing apparatus 100, an application program for executing image processing (which is called "image processing program 131", hereafter). Image processing program 131 provides a function for generating data of a 3D vision image (which is called "3D vision image data", hereafter) from data of an original plane image (which is called "original image data", hereafter). The 3D vision image is an image synthesized by combining an image to be viewed by the right eye of a user (which is called "a right eye image", hereafter) and an image to be viewed by the left eye of the user (which is called "a left eye image", hereafter) contained in a 3D vision image set. The right eye image and left eye image are provided with a parallax. That is, these images are generated by horizontally dislocating pixels of an object of the original image to a degree depending on the depth of the object (which is called "a pixel displacement", hereafter). The user views the right eye image with his/her right eye and views the left eye image with the left eye to perceive a depth of each object depending on the pixel displacement.

The image to be processed by image processing program 131 is obtained from, for example, video tape recorder 20. Video tape recorder 20 outputs analog signals representing a moving picture in response to an operation of the user. The analog signals are converted to digital data by A/D (Analog to Digital) converter 21 and inputted to image processing apparatus 100. CPU 10 captures the digital data on an image-by-image basis to store them in storage device 13 as original image data. In the present embodiment, the original image data is supposed to denote colors of each pixel constituting original image in an RGB format. That is, data corresponding to one pixel of the original image includes for its color a value R for red component, a value G for green component, and a value B for blue component.

Input device 30 comprises a pointing device such as a mouse and a keyboard for inputting characters and symbols, and outputs signals to CPU 10 in response to the user's operation. The user can input various parameters to be used for generating 3D vision image data from original image data (which is called "a 3D transformation parameter", hereafter) by operating input device 30 as required.

Display device 40 comprises a CRT (Cathode Ray Tube) or a liquid crystal display panel for displaying various images under control of CPU 10. Further, display device 40 of the present embodiment has a function of displaying an image of the 3D vision image data so that its right eye image can be viewed only by the right eye of the user and its left eye image can be viewed only by the left eye of the user. While various devices have been proposed in the past which enable a user to perceive the 3D vision image, the present embodiment is supposed to use a polarized filter or a polar screen.

Figure 2A:
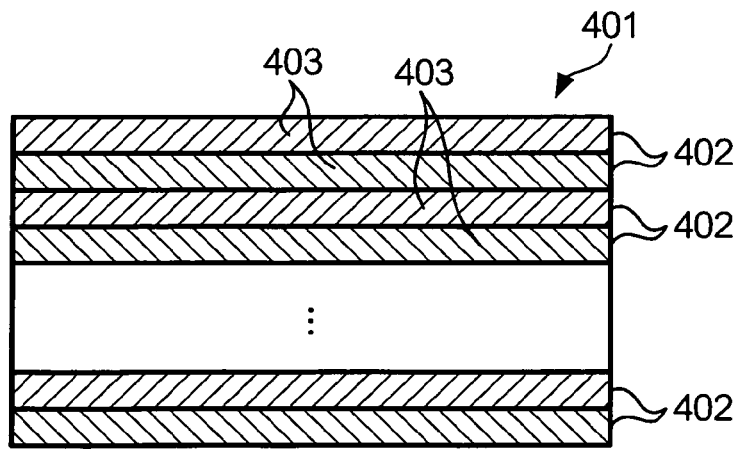
FIGS. 2A and 2B respectively illustrate a display device and 3D vision eye-glasses.
Figure 2B:
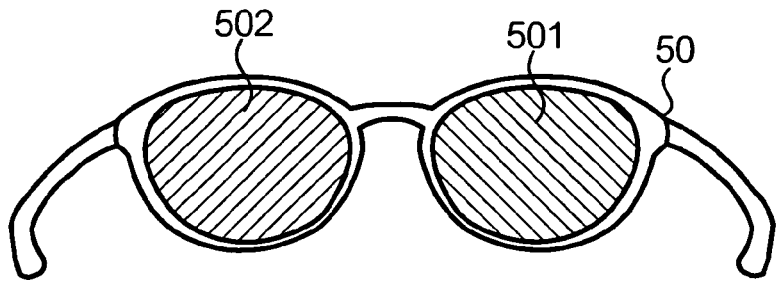

Specifically, as shown in FIG. 2A, on display surface 401 of display device 40, polarized filters 403 having two different polarizing directions are attached to areas corresponding to odd-numbered scanning lines 402 and even-numbered scanning lines 402 respectively. In the embodiment shown in FIG. 2A, the areas of display surface 401 corresponding to odd-numbered scanning lines 402 are attached with polarized filters 403 having polarizing axes directed from upper right to lower left of the drawing, and the areas corresponding to even-numbered scanning lines 402 are attached with polarized filters 403 having polarizing axes directed from upper left to lower right of the drawing. Meanwhile, the user to view the 3D vision image wears eye-glass-like equipment (which is called "3D vision eye-glasses 50", hereafter) on the head. 3D vision eye-glasses 50 comprises right eye lens 501 for covering the user's right eye and attached with a polarized filter having a polarizing axis with the same direction as the even numbered polarized filters 403, and left eye lens 502 for covering the user's left eye and attached with a polarized filter having a polarizing axis with the same direction as the odd numbered polarized filters 403. With such construction, by displaying a right eye image using the even-numbered scanning lines 402 and displaying a left eye image using the odd-numbered scanning lines 402, the right eye image is viewed only by the user's right eye, and the left eye image is viewed only by the left eye.

Figure 3:
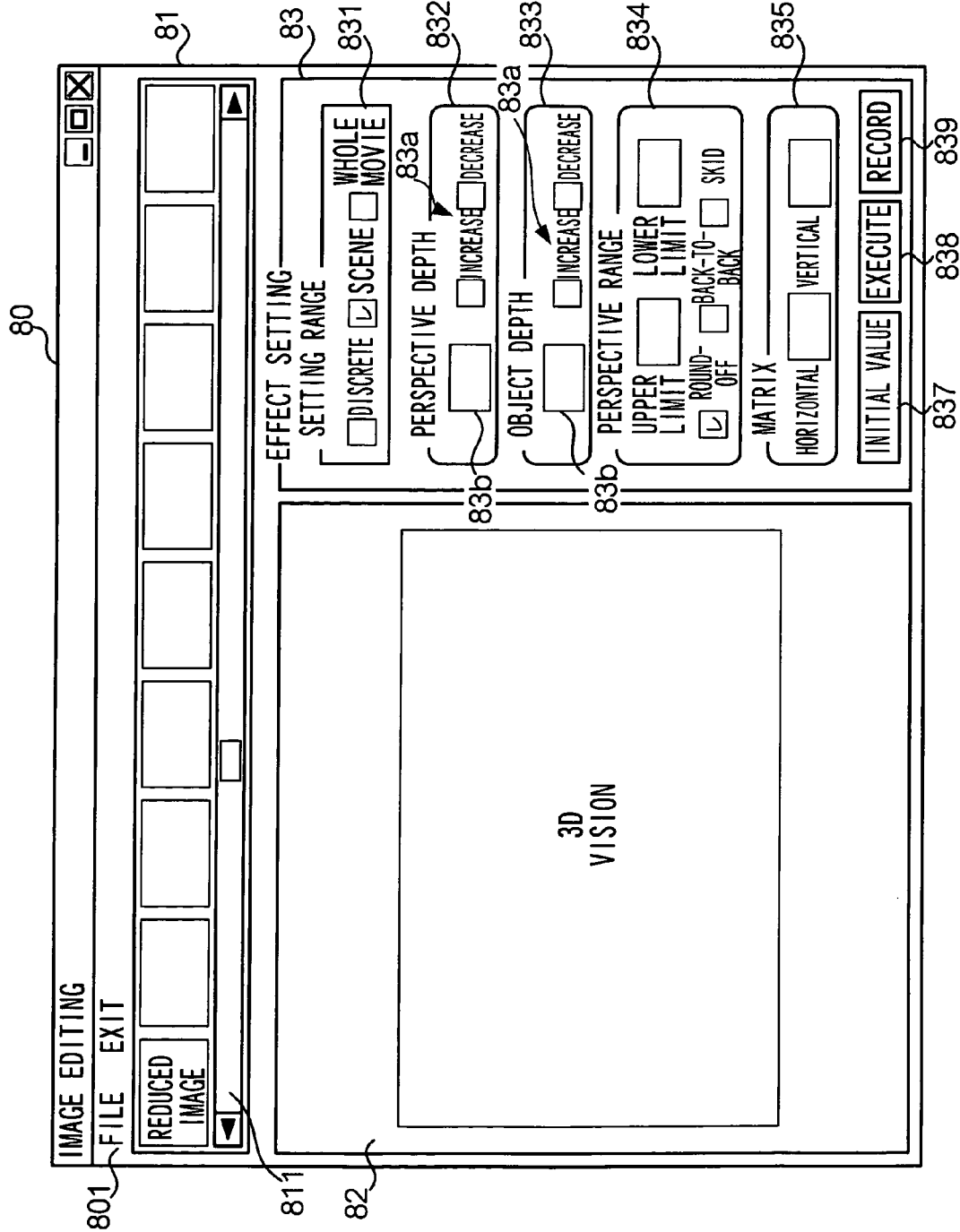
FIG. 3 illustrates a content of the image editing window.

Display device 40 also displays a screen (which is called "image editing window 80" hereafter) on the basis of which a user can edit the original image. As shown in FIG. 3, image editing window 80 includes reduced display area 81, image display area 82 and effect setting area 83. Reduced display area 81 displays plural original images constituting a moving picture in a reduced size and in a horizontally arranged fashion. The user can arbitrarily select original images to be displayed on reduced display area 81 from the original images of the moving picture by operating scroll bar 811 with a mouse. Image display area 82 is for displaying the 3D vision image generated from the original image.

Meanwhile, effect setting area 83 is for the user to input various 3D transformation parameters with regard to the 3D transformation process. The types of 3D transformation parameters to be inputted in effect setting area 83 are specified in FIG. 3. Before describing in detail the effect setting area, a specific description of the 3D transformation process carried out during execution of image processing program 131, then meanings of the various 3D transformation parameters inputted in effect setting area 83 will be given referring to the description. Here, we will take a case where a single image is an object of the 3D transformation process for the sake of clarity of description.

<Detail of the 3D Transformation Process>

Figure 4:
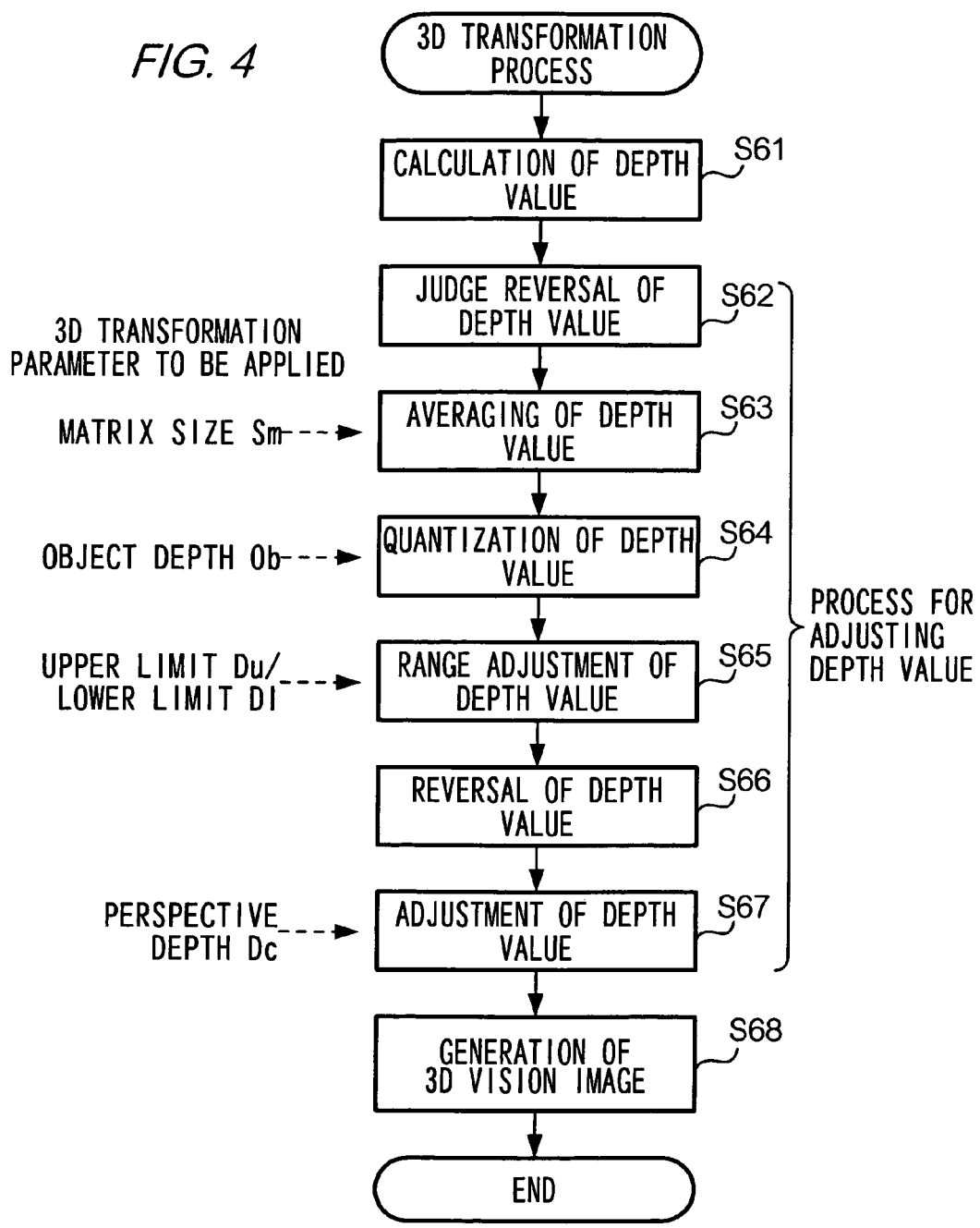
FIG. 4 illustrates a flowchart describing the content of the 3D transformation process.

FIG. 4 is a flowchart specifically describing the 3D transformation process. As shown in the figure, when the 3D transformation process is started, CPU 10 first calculates a depth value (a Z value) for each of the pixels based on the original image data to be processed (step S61). The depth value is a value based on which the pixel displacement is determined. In the present embodiment, a gradation of the original image presented in a gray-scale is employed as the depth value. More specifically, a summation of the three color components, i.e., red component R, green component G, and blue component B timed with each prescribed coefficient is employed as the depth value for a pixel, as calculated by the following formula (1).

$$(\text{DEPTH VALUE}) = R \times \alpha + G \times \beta + B \times \gamma \qquad (1)$$

In the above formula (1), coefficients $\alpha$, $\beta$, and $\gamma$ can be arbitrarily selected. More specifically, coefficient $\alpha$ is preferably determined as being about "0.3", coefficient $\beta$ is about "0.59", and coefficient $\gamma$ is about "0.11". In the present embodiment, the depth value is supposed to be designated by an eight-bit digital. Thus, the depth value can be any of 256 numbers ranging from "0" to "255".

Then CPU 10 executes an adjustment process for adjusting the depth value obtained in step S61 so that the 3D vision image can provide a more natural 3D effect (steps S62 to S67). FIG. 5 schematically illustrates the change in depth value according to the adjustment process. In the figure, the horizontal axis is assigned to a location of a pixel belonging to one scanning line 402, and the vertical axis is assigned to the depth value of each pixel. The depth value obtained in step S61 is shown in FIG. 5A. The processes of steps S62 to S67 will be described in detail hereafter, with reference to FIG. 5A.

First, CPU 10 judges whether it should reverse the magnitude relation between the pixel displacement and depth value (step S62). Suppose that pixel displacement is determined proportionally to a depth value obtained in step S61, then an object having a larger depth value (i.e., a brighter object) comes closer to the user, and an object having a smaller depth value (i.e., a darker object) goes farther from the user. If, in the actual original image, a darker object stays farther from the user, and a brighter object stays closer to the user, then the method can provide a natural 3D image. However, the original image may include a reverse situation where, for example, a dark object stays in a bright background such as a blue sky, in which an object having a larger depth value is positioned far from the user, and an object having a smaller depth value is positioned close to the user. If pixel displacement is determined proportionally to a depth value for such an image, the 3D vision image perceived by the user will be an unnatural one where perspective relation is reversed. Therefore, in step S62, it is judged if the magnitude relation between the pixel displacement and depth value should be reversed according to a tendency of depth value alteration of the original image.

Specifically, CPU 10 calculates an average for all the pixels included in the original image, and also calculates an average for the pixels included in each of plural areas (which is called "sampling areas", hereafter) which are formed by dividing the original image. The present embodiment is supposed to handle a case where original image G is divided into 9 sampling areas As, as shown in FIG. 6. Each of sampling areas As is assigned with a value (which is called "weighting value", hereafter) in advance, which is determined according to a general tendency regarding perspective of objects in the image. The general tendency here means that, in many cases, a scene in an upper region (e.g., the sky) of the original image stays farther than that in a lower region, and a scene in a central region of the original image stays farther than that in a peripheral region. Specifically, a larger depth value is assigned to sampling areas As in an upper region of original image G than that in a lower region, and a larger depth value is assigned to sampling areas As in a central region of original image G than that in a peripheral region. CPU 10 specifies sampling areas As having an average depth value larger than the total average depth value of original image G among the nine areas, and sums the weighting values of one or more sampling areas As which are specified. If the summed value is equal to or more than a prescribed threshold value, that is, if original image G has a tendency for the upper region to be brighter than the lower region, or the central region is brighter than the peripheral region, CPU 10 judges to reverse the magnitude relation between the pixel displacement and depth value. If, on the other hand, the summed value is less than a prescribed threshold value, that is, if original image G has a tendency that the upper region is darker than the lower region, or the central region is darker than the peripheral region, CPU 10 judges not to reverse the magnitude relation between the pixel displacement and depth value.

Following the reverse judgment process described above, CPU 10 executes a process for averaging the depth values calculated in step S61 (step S63). The reason for this averaging process is that, large deviation of depth value in neighboring pixels in the original image may cause disturbance of pixels in the 3D vision image.

Specifically, CPU 10 calculates, for each pixel P contained in original image G, an average of depth values in a specific area containing pixel P (which is called "matrix area Am", hereafter), and revises the depth value of pixel P by replacing it With the calculated average. That is, the depth value of each pixel P is changed to an average depth value of pixels P contained in matrix area Am, which contains pixel P in its upper left area. As a result of this process, variation of the neighboring pixels in the original image becomes smoother than that calculated in step S61, as shown in FIG. 5B. The size of matrix area Am used in this process (which is called "matrix size Sm", hereafter) is indicated by the user in effect setting area 83, shown in FIG. 3, as one of 3D transformation parameters. As matrix size Sm becomes larger, the number of the pixels for which an average depth value is calculated becomes larger, so that the difference between the depth values of the pixels as well as the 3D effect perceived by the user become smaller. On the other hand, as matrix size Sm becomes smaller, the number of pixels for which an average depth value is calculated becomes smaller, so that the difference between the depth values of the pixels as well as the 3D effect perceived by the user becomes larger.

Meanwhile, the minimum unit of pixel displacement for the 3D vision image is one pixel. This means that pixel displacement cannot be set to less than one pixel. Therefore, even if the pixel displacement is increased by the minimum unit of one pixel for each depth value increase of "1", when the depth value increase is the maximum of "255", the pixel displacement becomes as large as 256 pixels. However, excessively large pixel displacement (equal to or more than 8 mm, for example) may cause eye fatigue for the user viewing the 3D vision image and may disturb the user's perception of the 3D vision image. Therefore, CPU 10 executes a process of approximating the depth value of each pixel calculated in step S63 into several discrete values (step S64).

Specifically, CPU 10 divides the depth value obtained in step S63 by a specific numeral (which is called "round-off value MK", hereafter), then makes the result into an integer, and multiplies the integer by the same round-off value MK. Consequently, as shown in FIG. 5C, the depth value of each pixel is approximated to a numeral corresponding to an integral multiplication of the round-off value MK. That is, the round-off value MK can be said to be a numeral denoting a dimension of mutual distances between the discrete values to which the depth value is approximated. In the present embodiment, the round-off value MK employs a value obtained by dividing a possible maximum depth value (255) by an object depth (which is called "object depth Ob", hereafter) and making the result into an integer. Object depth Ob denotes a possible variation of the approximated depth values. Also, since the variation of pixel displacement is proportional to the variation of the depth value as described above, object depth Ob can be said to be a value denoting a distance between a position which the user recognizes as the farthest of the 3D vision image and a position which the user recognizes as the closest of the 3D vision image. Object depth Ob is indicated by the user in effect setting area 83, shown in FIG. 3, as one of several 3D transformation parameters. It is possible that round-off value MK itself is directly indicated by the user as one of several 3D transformation parameters.

Following the quantization process described above, CPU 10 executes a process for limiting the depth value of each pixel within a specific range (step S65). Upper limit Du and lower limit Dl of the specific range is indicated by the user in effect setting area 83, shown in FIG. 3, as one of several 3D transformation parameters. Also, in the present embodiment, three methods are provided for limiting the depth value, called "round-off", "back-to-back", and "skid", and one of these three is indicated by the user in image editing window 80, shown in FIG. 3, as one of several 3D transformation parameters. These three methods in particular are described below.

First, when the user has indicated "round-off", CPU 10 replaces the depth value of each pixel with lower limit Dl if the depth value is smaller than lower limit Dl, and replaces the depth value of each pixel with upper limit Du if the depth value is larger than upper limit Du, as shown in FIG. 8A. When the user has indicated "back-to-back", CPU 10 replaces a depth value larger than upper limit Du with a reversed value of the depth value relative to upper limit Du, and replaces a depth value smaller than lower limit Dl with a reversed value of the depth value relative to lower limit Dl, as shown in FIG. 8B. When the user has indicated "skid", CPU 10 replaces the depth value of each pixel with a depth value translated relative to upper limit Du or lower limit Dl, as shown in FIG. 8C. That is, CPU 10 replaces a depth value smaller than lower limit Dl with a value calculated by adding the depth value with a value corresponding to a difference between lower limit Dl and the minimum possible value (0). In a similar manner, CPU 10 replaces a depth value larger than lower limit Dl with a value calculated by subtracting a value corresponding to a difference between upper limit Du and the maximum possible value (255) from the depth value. With this process, depth values for all the pixels are limited within a range between lower limit Dl and upper limit Du.

Next, CPU 10 executes a reverse process in accordance with the result of the judgment of step S62 (step S66). That is, if it has been judged to reverse in step S62, CPU 10 adjusts the depth value of each pixel so that the magnitude relation between the pixel displacement and the depth value is reversed. More specifically, CPU 10 calculates a new depth value for every pixel by subtracting the depth value obtained in step S65 from the maximum depth value (255). By this process, the larger the depth value, the smaller the pixel displacement becomes, and the smaller the depth value, the larger the pixel displacement becomes. Meanwhile, if CPU 10 has judged not to reverse in step S62, CPU 10 maintains the depth value for each pixel as obtained in step S65.

Next, CPU 10 adds a common value (hereafter called "perspective depth Dc") to a depth value of every pixel obtained as a result of step S66 (step S67). Perspective depth Dc is a value to denote a depth value to be commonly reflected to the whole original image. That is, while an area between a position that the user recognizes as the farthest and a position that the user recognizes as the closest is specified by object depth Ob, the depth for the whole area is specified by perspective depth Dc. Perspective depth Dc is indicated by the user at effect setting area 83 shown in FIG. 3 as one of several 3D transformation parameters. Perspective depth Dc is not limited to a positive number and can be selected as "0" or a negative number.

The foregoing describes processes regarding the adjustment of the depth value. After these processes have been carried out, CPU 10 generates a 3D vision image based on the obtained depth values (step S68). That is, each pixel within the original image is horizontally displaced to a degree depending on the depth value of the pixel to generate a right eye image and a left eye image, which are then synthesized into a 3D vision image.

Referring again to FIG. 3, portion 831 within image editing window 80 is an area for indicating an area within the original image to be edited, or to which the 3D transformation parameters indicated by the user are applied. In the present embodiment, the user can select a range of original images to which the 3D transformation parameters are applied, by clicking a mouse of input device 30 on one of the check boxes in the area, from among: any one original image from among many original images constituting the moving picture (shown as "Discrete" in FIG. 3); original images contained in one of the scenes of the moving picture (shown as "Scene" in FIG. 3); and all of the original images of the moving picture (shown as "Whole Picture" in FIG. 3).

Effect setting area 83 also contains plural portions at which the user inputs 3D transformation parameters to be used in the 3D transformation process of the original image. More specifically, portion 832 in effect setting area 83 is for inputting perspective depth Dc, and portion 833 is for inputting object depth Ob. Portions 832 and 833 comprise a command button for stepwise change of each 3D transformation parameter and an edit box for displaying the numeral decided by the command button and for the user to directly input a 3D transformation parameter from the keyboard of input device 30. Meanwhile, portion 834 shown in FIG. 3 is for inputting upper limit Du and lower limit Dl used in step S65. Portion 834 comprises, other than an area for inputting upper limit Du and lower limit Dl, a check box for selecting a method for limiting the range of depth value in step S65 as described above. Also, portion 835 is for inputting matrix size Sm used in step S63 by indicating numbers of pixels corresponding to horizontal and vertical lengths of matrix area Am.

Meanwhile, initial value button 837 in effect setting area 83 is a command button for commanding that each 3D transformation parameter is changed to an initial value which is stored in storage device 13 in advance. Execution button 838 in effect setting area 83 is a command button for commanding to reflect a 3D transformation parameter indicated at effect setting area 83 to an actual 3D transformation process. Also, record button 839 is a command button for commanding to store the 3D transformation parameters indicated at effect setting area 83 into storage device 13.

Figure 9:
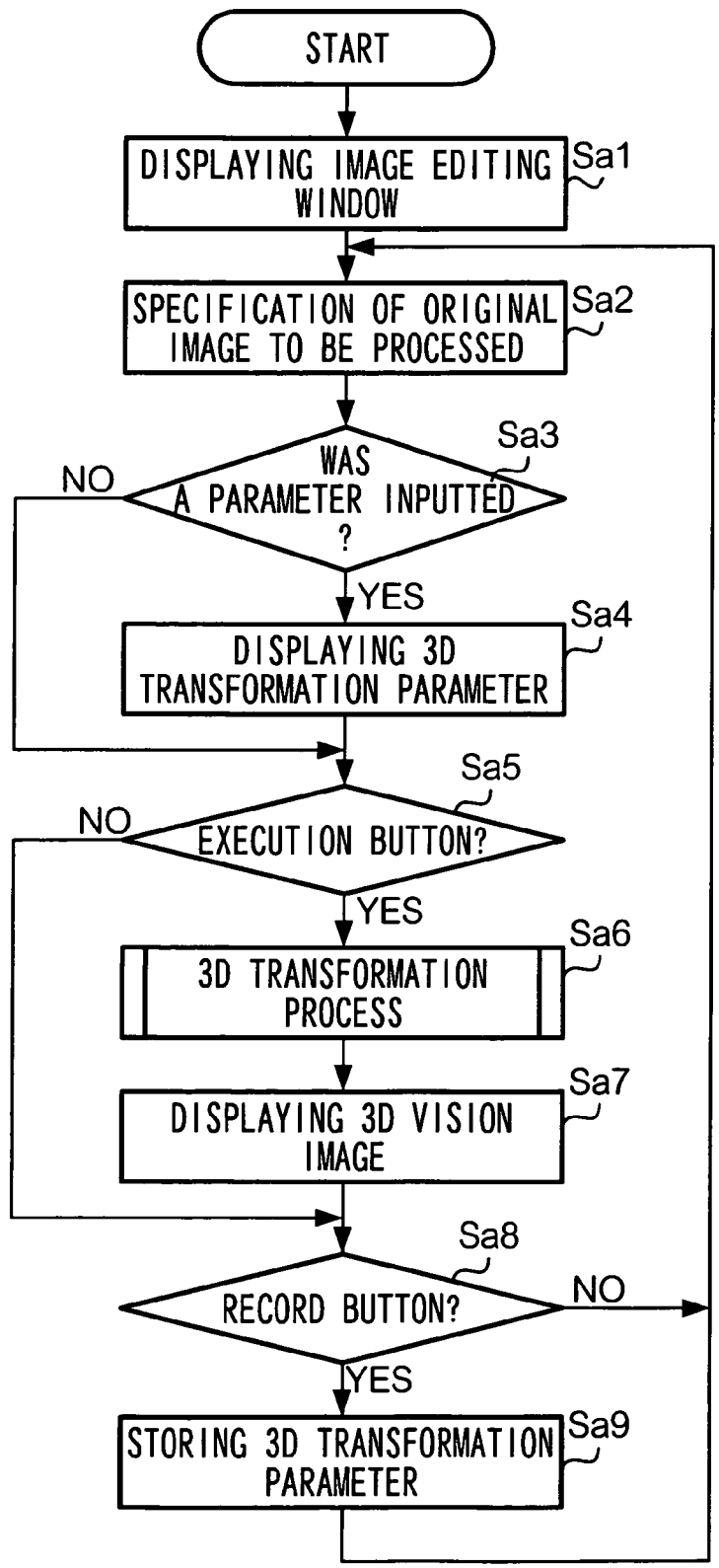
FIG. 9 illustrates a flowchart describing the content of an image processing program.

Next, the operation of the present embodiment will be described. When the user operates input device 30 to start running image processing program 131, CPU 10 reads out image processing program 131 stored in the storage device 13 into RAM 12 and executes it sequentially. FIG. 9 is a flowchart showing a sequence of the processes carried out when image processing program 131 is executed. The 3D transformation process described by referring to FIG. 4 is executed in step Sa6 in FIG. 9.

When image processing program 131 is started, CPU 10 first displays image editing window 80 shown in FIG. 3 on display device 40 (step Sa1). Then, the user selects a moving picture stored in storage device 13 by operating file button 801 displayed in image editing window 80. Detecting the operation, CPU 10 reads out the selected moving picture file from storage device 13 to RAM 12 and displays plural original images contained in the file on reduced display area 81.

Meanwhile, the user selects one or more original images to be objects of the 3D transformation process by appropriately operating input device 30. Specifically, the user first selects one of the check boxes displayed on portion 831 by clicking the mouse of input device 30. When selecting "Discrete" at portion 831, the user clicks any one of the original images displayed in reduced display area 81 to select the clicked original image as the object of the 3D transformation process. When selecting "Scene" at portion 831, the user clicks any one of the original images displayed in reduced display area 81 to select plural original images constructing a scene including the clicked original image as the object of the 3D transformation process. Meanwhile, when selecting "Whole Picture" at portion 831, the user can select all of the original images contained in the moving picture as objects of the 3D transformation process as a whole. CPU 10 detects the user's operation and specifies one or more original images as the object of the 3D transformation process (step Sa2).

Then, CPU 10 judges if the user has made any operation to indicate any of the 3D transformation parameters displayed at effect setting area 83 (step Sa3). When detecting the operation, CPU 10 displays the inputted 3D transformation parameters in the respective portions of effect setting area 83 on display device 40 (step Sa4). If it is judged that initial value button 837 shown in FIG. 3 is operated in step Sa3, CPU 10 reads out the initial values of respective 3D transformation parameters stored in storage device 13, and displays the values in the respective portions of effect setting area 83 (step Sa4). If, on the other hand, no indication of the 3D transformation parameter is made, CPU 10 transfers the process to step Sa5 by bypassing step Sa4.

Then, CPU 10 judges if execution button 838 included in effect setting area 83 has been operated by the user (step Sa5). If execution button 838 is judged as having been operated, CPU 10 executes the 3D transformation process shown in FIG. 4 by using the 3D transformation parameters displayed in effect setting area 83 at the time (step Sa6). Then, CPU 10 displays the 3D vision image obtained by the 3D transformation process on image display area 82 (step Sa7). The user can confirm that the 3D vision image reflected with the 3D transformation parameters of the user's own choice by viewing display surface 401 of display device 40 through 3D vision eye-glasses 50. If judged that execution button 838 was not operated in step Sa5, CPU 10 transfers the process to step Sa8 by bypassing steps Sa6 and Sa7.

Then, CPU 10 judges if record button 839 included in effect setting area 83 was operated by the user (step Sa 8). If CPU 10 judges that it was not operated, CPU 10 returns the process to step Sa2 by bypassing step Sa9.

Figure 10:
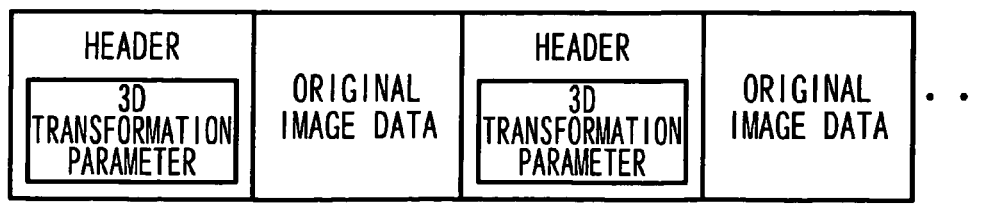
FIG. 10 illustrates a state where original image data and 3D transformation parameters are stored in a storage device.

On the contrary, when CPU 10 judges that record button 839 was operated by the user, CPU 10 associates the original image data currently selected as the process object with the 3D transformation parameter currently indicated at effect setting area 83 and stores them in storage device 13 (step Sa9). Specifically, CPU 10 first searches the original image data specified in step Sa2 from among many original image data stored in storage device 13, then adds the current 3D transformation parameter as a header to the top portion of each of one or more searched original image data as shown in FIG. 10. While the 3D transformation parameter is added as header here, it may be added as footer to the bottom of original image data. Then, CPU 10 transfers the process to step Sa2.

These are the operations to be carried out for editing images. Meanwhile, if the user operates the inputting device to indicate a command to display the original images, to which the 3D transformation parameter is already set, as 3D vision images, CPU 10 sequentially executes the 3D transformation processes (shown in FIG. 4) for the original image data by using the 3D transformation parameters added to the original image data, and displays the obtained 3D vision image on display device 40. More specifically, CPU 10 executes the 3D transformation processes, at the time of displaying any of the original images constituting the moving picture, or in real time, for the original image data so as to sequentially display the obtained 3D vision images on display device 40.

As described above, in the present embodiment, the 3D transformation parameter is added to the original image data in accordance with the user's indication and is stored in storage device 13. Therefore, when 3D vision images are generated from the original image data afterwards, there is no need for the user to input any 3D transformation parameter, which results in reducing the burden on a user.

Also, in the present embodiment, such parameters as perspective depth Dc and object depth Ob for adjusting the depth value, upper limit Du and lower limit Dl of depth value can be optionally selected by the user, so that the user can obtain a desired 3D vision image. For example, the overall depth of a 3D vision image can be changed depending on perspective depth Dc, and the distance between the positions perceived as the closest and the farthest (3D effect of the image) can be changed depending on object depth Ob. Also, by properly selecting upper limit Du and lower limit Dl, a natural 3D effect can be obtained while reducing image disturbance.

B: Second Embodiment

In the above-described first embodiment, the 3D transformation process is executed by using a 3D transformation parameter selected by the user. In the present embodiment, on the other hand, the 3D transformation parameters are specified based on information obtained through an image pickup device such as a camera. In the following description, the technical components of the present embodiment having the same role as the first embodiment will be depicted with the same numerals and the description will accordingly be omitted.

FIG. 11 shows a block diagram illustrating image processing apparatus 100 according to the present embodiment. As shown in the figure, bus 15 of image processing apparatus 100 is connected to image pickup device 70 through an interface (not shown). Image pickup device 70 is for picking up a stationary image or moving images, and is comprised of, for example, a digital camera. Image pickup device 70 comprises image pickup element 71, control section 72, and storage section 73. Image pickup element 71 is a device for picking up an image of an object and generates original image data representing a plane image of the object, and is comprised of, for example, a CCD (Charge Coupled Device). Control section 72 is a device for determining a condition for image pickup element 71 to pick up images (hereafter referred to as "image pickup condition") in accordance with the user's indication or the prescribed algorithm, and is comprised of a CPU for executing various arithmetic or control operations. The image pickup condition determined by control section 72 includes various parameters for regulating the amount of light used for image pickup, such as shutter speed, aperture, or exposure. Control section 72 also determines, as one of image pickup conditions, whether various adjustments such as backlight compensation for increasing exposure are applied or not. Meanwhile, storage section 73 is a device for storing the original image data picked up by image pickup element 71, and comprises, for example, a semiconductor memory. When image pickup element 71 picks up an image, the obtained original image data and the image pickup condition applied to the image pickup are associated with each other and they are stored in storage section 73.

In the present embodiment, the 3D transformation parameter used for the 3D transformation process in image processing apparatus 100 is specified based on the image pickup condition. Specifically, a 3D transformation parameter (which may be called "extension process flag" hereafter) denoting whether the process for extending the distribution range for the depth value is executed according to an image pickup condition with regard to an amount of exposure such as shutter speed and aperture is specified. Also, a 3D transformation parameter (called "reversal process flag" hereafter) denoting whether the magnitude relation between the pixel displacement and depth value should be reversed according to an image pickup condition such as an application of backlight compensation. Details of the method for specifying the 3D transformation parameter will be described below.

If an original image is picked up in an environment with abundant light, the depth values obtained from the original image through step S61 will on the whole be unevenly distributed in a larger value range A (i.e., a range of dilute gradation) as shown in FIG. 12A. If for instance, the amount of light for the image pickup is reduced by increase of shutter speed or decrease of aperture, many of the depth values obtained from the original image will be distributed in an intermediate gradation range B as shown in FIG. 12B. However, as the whole environment is highly lighted as shown in FIG. 12A, many of the depth values in this case will also be unevenly distributed in the specific range B. Since the depth of the 3D vision image (or pixel displacement determining the depth) is determined according to the depth value, as described in the previous embodiment, direct use of the depth values unevenly ranging in a narrow range will possibly lead to a 3D vision image with a poor 3D effect.

Therefore, in the present embodiment, if it is judged that the image pickup environment is over-lighted, a process for extending the distribution of depth values is executed. That is, the depth values unevenly distributed in the specific range B are replaced by depth values evenly distributed in a whole gradation range as shown in FIG. 12C. More specifically, the depth values unevenly distributed in the specific range B are multiplied by a certain coefficient so that the smallest depth value within the range is converted to "0", the largest depth value is converted to "255", and the rest of the intermediated depth values are converted so as to remain within a range of "0" and "255". In the present embodiment, as shown in FIG. 12C, the coefficient is selected so that the smaller depth values within the range B will have smaller mutual distances, and the larger depth values within the range B will have larger mutual distances after the conversion. While the embodiment handles a case where an image pickup environment is highly lighted, a similar process is executed in a case where an image pickup environment is dark.

In the present embodiment, if the image pickup condition is set so that the amount of light used for an image pickup does not exceed a prescribed threshold value, that is, the shutter speed is set faster than a prescribed threshold speed, or the aperture is set lesser than a prescribed threshold, the extension process flag, which is a 3D transformation parameter, is specified so that the depth value extension process described above will be executed. And only when the extension process flag denoting execution of the depth value extension process is set, the depth value extension process is executed just prior to step S63 shown in FIG. 4.

Also, in the present embodiment, the reversal process flag denoting necessity of a reversal process in step S66 is specified depending on an application of backlight compensation. That is, if the backlight compensation is applied when picking up the image, it means that, in many cases, a darker object (having a smaller depth value) is positioned at a shorter distance, and a brighter object (having a larger depth value) is positioned at a longer distance. Therefore, if the image pickup condition includes use of the backlight compensation, the reversal process flag value is specified so as to execute the reversal process in step S66.

Next, an operation of the present embodiment will be described. The user picks up images of his/her desired object and connects image pickup device 70 to image processing apparatus 100. When the user operates input device 30 in a prescribed manner to command running of image processing program 132, CPU 10 reads out image processing program 132 from storage device 13 into RAM 12 and executes it sequentially. FIG. 13 is a flowchart illustrating the sequence when image processing program 132 is executed.

As shown in the figure, CPU 10 first acquires the original image data and the image pickup condition stored in storage section 73 through control section 72 of image pickup device 70, and stores them in storage device 13 (step Sb1). Then, CPU 10 specifies the 3D transformation parameters based on the image pickup condition stored in storage section 73 (step Sb2). In the present embodiment, the extension process flag is specified based on the image pickup condition such as shutter speed and aperture, and the reversal process flag is specified based on an application of backlight compensation, as described above.

Then, CPU 10 adds the 3D transformation parameter specified in step Sb2 to the original image data stored in storage device 13 (step Sb3). As a result, the content stored in storage device 13 is as shown in FIG. 10. However, in some cases, not all of the 3D transformation parameters can be obtained depending on the image pickup condition acquired from image pickup device 70. In these cases, 3D transformation parameters prepared in advance are added to the original image data together with the 3D transformation parameters. This process may be performed in a manner that CPU 10 guides the user to input the necessary 3D transformation parameters as described in the first embodiment, which is added to the original image data.

Then, CPU 10 executes the 3D transformation process using the 3D transformation parameters thus added to the original image data (step Sb4). The content of the process is similar to that explained using FIG. 4, except that the depth value extension process may be executed just prior to step S63 depending on the content of the extension process flag. CPU 10 displays the 3D vision image obtained by the 3D transformation process on display device 40 (step Sb5) to finish the process shown in FIG. 13. To display the 3D vision image already set with 3D transformation parameters, the same operation is performed as in the first embodiment.

According to the present embodiment, since the 3D transformation parameters are specified depending on the image pickup condition acquired by image pickup device 70, the burden on the user for inputting the 3D transformation parameters are alleviated. Further, since the environment at the time of image pickup (such as lightness or darkness) is well suited to the image pickup conditions, a 3D vision image of an accurate reproduction of the original image is obtained by using such 3D transformation parameters.

While the present embodiment is constructed so that image pickup device 70 is separate from image processing apparatus 100, image pickup device 70 can be made integral to image processing apparatus 100. For example, an electronic device integrally including image pickup device 70 (such as a cellular phone) can be used as image processing apparatus 100.

C: Modified Embodiments

The first and second embodiments are described merely for exemplification, and can be modified within a range that does not deviate from the spirit of the invention. The possible modifications of the embodiments are as follow.

C-1: Modified Embodiment 1

While in the above-described embodiments the 3D transformation parameters are added to original image data, the method of storing the 3D transformation parameters is not limited to this. For example, as shown in FIG. 14, 3D transformation parameters and original image data are stored in separate files in storage device 13 together with a table describing the relationship between original image data and 3D transformation parameters. The table shown in FIG. 14 correlates information for identifying the original image data and information for identifying a 3D transformation parameter to be used for executing a 3D transformation process of original image data. CPU 10 may read out the correlated 3D transformation parameter of original image data from the table when CPU 10 executes a 3D transformation process of the original image data, and use it in the 3D transformation process.

In another construction, as shown in FIG. 15, 3D transformation parameters are stored in storage device 13 as a separate file from that of original image data, and the file contains information specifying original image data to which each 3D transformation parameter is to be applied. As just described, in the present invention, it is sufficient if 3D transformation parameters are correlated with original image data in any available method.

C-2: Modified Embodiment 2

The types of 3D transformation parameters are not limited to those described in the above embodiments. For example, information denoting whether the respective scanning lines 402 displaying right eye image and left eye image are odd-numbered or even numbered can be stored in storage device 13 as one of several 3D transformation parameters. If scanning lines 402 for right eye image and left eye image are inter-changed, the right eye image is viewed by the user's left eye, and the left eye image is viewed by the user's right eye, so that the back and forth relationship in the 3D vision image is reversed. Also, a parameter indicating dimension, position or number of sampling areas As used in step S62 can be stored as a 3D transformation parameter in storage device 13. While, in the second embodiment described above, the extension process flag or reversal process flag are specified based on the image pickup condition, it is permissible that other 3D transformation parameters such as perspective depth Dc or object depth Ob are specified based on the image pickup condition.

C-3: Modified Embodiment 3

While, in the above-described embodiments, a 3D vision system is realized by attaching polarized filters on display surface 401 of display device 40, the method for realization of the 3D vision is not limited to this, and various other known methods can be employed. For example, an HMD (Head Mounted Display) system in which different display surfaces are viewed by the user's right and left eyes; and a time-sharing shutter glass system in which, while displaying a right eye image and a left eye image alternately, LCD panels located at the lenses of a glass (so called "LCD shutter") are switched between a shaded state and a transparent state in synchronization to the time-sharing display. Another adoptable system is a lenticular system that combines an LCD panel and a lenticular lens that guides a light of the left eye image to the left eye, and a light of the right eye image to the right eye. And another system comprises a slit formed on a display surface of a display device which enables pixels of the left eye image to be viewed by the left eye, and pixels of the right eye image to be viewed by the right eye. In general, any system can be used as long as it enables one of two images having a mutual parallax to be viewed at one end by the user's left eye and the other by the user's right eye, no matter what structure the system has. It is also possible to provide a system where a user can select a method for realizing 3D vision from several available methods, and the selected method is correlated to original image data as one of 3D transformation parameters.

C-4: Modified Embodiment 4

While, in the above embodiments, 3D transformation parameters are specified depending on the user's indication or image pickup conditions, the following systems can be also adopted. That is, plural groups of 3D transformation parameters set with different values are stored in storage device 13 in advance. And one of the groups is selected depending on the indication of the user or image pickup conditions so that the 3D transformation process is executed in accordance with the 3D transformation parameters included in the selected group.

C-5: Modified Embodiment 5

While, in the above embodiments, original image data is captured from video tape recorder 20, the original image data can be stored in storage device 13 in advance, or the original image data can be supplied from various information supplying facilities such as network systems as typified by the Internet, and a communication satellite. Original image data can also be captured from various devices such as: an image pickup device for picking up stationary images or moving pictures (such as a digital camera); a disk drive device for reading out data from various recording medium such as a CD-ROM (Compact Disk-Read Only Memory) and a DVD (Digital Versatile Disk); or a TV receiver. If the original image data is available in a digital form, A/D converter 21 shown in FIG. 1 is not required.

Also, in the present embodiment, the original image to be processed into a 3D vision image is not limited to colored images. For example, monochrome images, images obtained by infrared cameras, or images of X-ray pictures (radiographs) of human bodies can be used as the object of the 3D transformation process. As just described, types of original image data, content of the object, or method of capturing the original image are irrelevant to the present invention.

As described above, the present invention can reduce the burden on a user of having to indicate various conditions to execute 3D transformation processes of images.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a 3D transformation unit that comprises:
      a calculation unit that obtains a depth value for each pixel from original image data of an image based on a gradation of each pixel of the original image;
      an adjusting unit that adjusts the depth value obtained by the calculation unit by using a supplied 3D transformation parameter; and
      an image generating unit that generates a right eye image and a left eye image mutually having a parallax corresponding to the depth value obtained by the adjusting unit;

a parameter specifying unit that specifies the 3D transformation parameter used for adjusting the depth value process depending on an indication by a user; and a control unit that stores the 3D transformation parameter specified by the parameter specifying unit in a storage device in association with the original image data.

2. The image processing apparatus of claim 1, wherein
the adjusting unit comprises a unit that adds a perspective depth value, which is a common value with regard to all pixels, to the depth value for each pixel, and
the 3D transformation parameter specified by the parameter specifying unit includes the perspective depth value.

3. The image processing apparatus of claim 1, wherein
the adjusting unit comprises a unit that revises the depth value for each pixel into an average depth value of the depth values of pixels in an area including each pixel, and
the 3D transformation parameter specified by the parameter specifying unit includes a value denoting a dimension of the area.

4. The image processing apparatus of claim 1, wherein
the adjusting unit comprises a unit that approximates the depth value for each pixel into one of a plurality of discrete values, and
the 3D transformation parameter specified by the parameter specifying unit includes a value used for specifying a round-off value denoting a distance between the discrete values.

5. The image processing apparatus of claim 4, wherein
the value used for specifying the round-off value is an object depth value denoting a number of the discrete values.

6. The image processing apparatus of claim 1, wherein
the adjusting unit comprises a unit that adjusts the depth value for each pixel to a value within a prescribed range, and
the 3D transformation parameter specified by the parameter specifying unit includes at least one of an upper limit and a lower limit of the prescribed range.

7. The image processing apparatus of claim 1, wherein
the control unit stores a plurality of sets of the original image data each of which is data of an image constituting a moving picture in the storage device, and
the 3D transformation unit executes the 3D transformation process with regard to each of the plurality of sets of the original image data in real time using the 3D transformation parameter stored in the storage device in association with the original image data.

8. The image processing apparatus of claim 1, the 3D transformation parameter specified by the parameter specifying unit including a parameter, the parameter being shared by all of the pixels of one or plural original image data.

9. An image processing apparatus comprising:
a 3D transformation unit that comprises:
 a calculation unit that obtains a depth value for each pixel from original image data of an image based on a gradation of each pixel of the original image;
 an adjusting unit that adjusts the depth value obtained by the calculation unit by using a supplied 3D transformation parameter; and
 an image generating unit that generates a right eye image and a left eye image mutually having a parallax corresponding to the depth value obtained by the adjusting unit;

a capture unit that captures an original image data of an image picked up by an image pickup device for picking up an image of an object and an image pickup condition under which the image is picked up;
a parameter specifying unit that specifies the 3D transformation parameter to be used for adjusting the depth value process based on the image pickup condition captured by the capture unit; and
a control unit that stores the 3D transformation parameter specified by the parameter specifying unit in a storage device in association with the original image data captured by the capture unit.

10. The image processing apparatus of claim 9, the image pickup condition including various factors for regulating an amount of light under which the image is picked up, the image pickup condition under which the image is picked up being associated with the corresponding original image data of the image picked up.

11. A storage medium readable by a computer, the storage medium storing a program for making a computer function as:
a 3D transformation unit that comprises:
 a calculation unit that obtains a depth value for each pixel from original image data of an image based on a gradation of each pixel of the original image;
 an adjusting unit that adjusts the depth value obtained by the calculation unit by using a supplied 3D transformation parameter; and
 an image generating unit that generates a right eye image and a left eye image mutually having a parallax corresponding to the depth value obtained by the adjusting unit;
a parameter specifying unit that specifies the 3D transformation parameter used for adjusting the depth value process depending on an indication by a user; and
a control unit that stores the 3D transformation parameter specified by the parameter specifying unit in a storage device in association with the original image data.

12. A storage medium readable by a computer, the storage medium storing a program for making a computer function as:
a 3D transformation unit that comprises:
 a calculation unit that obtains a depth value for each pixel from original image data of an image based on a gradation of each pixel of the original image;
 an adjusting unit that adjusts the depth value obtained by the calculation unit by using a supplied 3D transformation parameter; and
 an image generating unit that generates a right eye image and a left eye image mutually having a parallax corresponding to the depth value obtained by the adjusting unit;
a capture unit that captures an original image data of an image picked up by an image pickup device for picking up an image of an object and an image pickup condition under which the image is picked up;
a parameter specifying unit that specifies the 3D transformation parameter to be used for adjusting the depth value process based on the image pickup condition captured by the capture unit; and
a control unit that stores the 3D transformation parameter specified by the parameter specifying unit in a storage device in association with the original image data captured by the capture unit.

* * * * *